United States Patent
Fang et al.

(10) Patent No.: US 12,530,368 B1
(45) Date of Patent: Jan. 20, 2026

(54) SCALABLE DATA IMPORT INTO MANAGED LAKEHOUSES

(71) Applicant: Google LLC, Mountain View, CA (US)

(72) Inventors: Zhou Fang, Santa Clara, CA (US); Jian Guo, Kirkland, WA (US); Thibaud Hottelier, Seattle, WA (US); Anoop Kochummen Johnson, Fremont, CA (US); Micah Kornfield, Seattle, WA (US); Justin Levandoski, Seattle, WA (US); Yuri Volobuev, Walnut Creek, CA (US); Yiwei Zhang, Bellevue, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/779,282

(22) Filed: Jul. 22, 2024

(51) Int. Cl.
  *G06F 16/25* (2019.01)
  *G06F 16/23* (2019.01)

(52) U.S. Cl.
  CPC ........ *G06F 16/258* (2019.01); *G06F 16/2358* (2019.01)

(58) Field of Classification Search
  CPC .. G06F 16/258; G06F 16/2358; G06F 3/0643; G06F 16/2456
  See application file for complete search history.

(56) References Cited

U.S. PATENT DOCUMENTS

| | | |
|---|---|---|
| 11,748,318 B1 | 9/2023 | Cseri et al. |
| 12,135,621 B1 * | 11/2024 | Thomas .............. G06F 11/1469 |
| 2020/0293193 A1 | 9/2020 | Littlefield et al. |
| 2021/0011891 A1 | 1/2021 | Soza |
| 2023/0140109 A1 | 5/2023 | Dasi et al. |
| 2023/0229658 A1 * | 7/2023 | Newman ........... G06F 16/24539 707/713 |
| 2024/0330192 A1 * | 10/2024 | Cardente ............. G06F 12/0891 |

OTHER PUBLICATIONS

N. William Rayner, Chapter 6—Data Handling, Editor(s): Eleftheria Zeggini, Andrew Morris, Analysis of Complex Disease Association Studies, Academic Press, 2011, pp. 87-94 (Year: 2011).*

Rey et al., Seamless Integration of Parquet Files into Data Processing, Business, Technologie und Web (BTW 2023), Lecture Notes in Informatics (LNI), Gesellschaft für Informatik, Bonn 2023, pp. 235-258. (Year: 2023).*

"Introducing Tabular" [online]. [Retrieved Apr. 26, 2024] Retrieved from the internet: <https://docs.tabular.io/en/introducing-tabular.html>. 4 pages.

(Continued)

*Primary Examiner* — Cheyne D Ly
(74) *Attorney, Agent, or Firm* — Lerner David LLP (57) ABSTRACT

Aspects of the disclosure are directed to managing files in data lakehouses using rewrite-free loading. Rewrite-free loading includes keeping track of information from data files that could be missing when imported to the data lakehouses without having to perform full-copy loading. Rewrite-free loading can store this information in table metadata or augment headers and/or footers of the data files with this information when importing to a data lakehouse. Rewrite-free loading allows for more accurate management of data lakehouses with lower computational costs.

18 Claims, 5 Drawing Sheets

(56) References Cited

OTHER PUBLICATIONS

"Migrating Hive workloads to Iceberg" Manual. Cloudera, Jan. 2023. 10 pages.

Armbrust, M., et al., "Lakehouse: A New Generation of Open Platforms that Unify Data Warehousing and Advanced Analytics", Proceedings of CIDR. vol. 8., Jan. 2021. 8 pages.

Malone, J., "Iceberg Tables: Powering Open Standards with Snowflake Innovations" [online] Aug. 8, 2022. Retrieved from the internet: <https://www.snowflake.com/blog/iceberg-tables-powering-open-standards-with-snowflake-innovations>. 7 pages.

Strengholt, P., "Scalable Data Management with Microsoft Fabric and Microsoft Purview", [online]. Apr. 8, 2024. Retrieved from the internet: <https://piethein.medium.com/scalable-data-management-with-microsoft-fabric-and-microsoft-purview-7e54456559d9>, 34 pages.

International Search Report and Written Opinion for International Application No. PCT/US2025/024473 dated Jul. 15, 2025. 16 pages.

Levandoski et al. BigLake: BigQuery's Evolution toward a Multi-Cloud Lakehouse. Proceedings of the 55th ACM Technical Symposium on Computer Science Education V. 1, ACMPUB27, New York, NY, USA, Jun. 9, 2024 (Jun. 9, 2024), pages 334-346, DOI: 10.1145/3626246.3653388.

Mazumdar et al. The Data Lakehouse: Data Warehousing and More. arxiv.org, Cornell University Library, 201 OLIN Library Cornell University Ithaca, NY 14853, Oct. 12, 2023 (Oct. 12, 2023), 12 pages.

Tutorial: Loading and unloading Parquet data—Snowflake Documentation. Unload the table. Jun. 14, 2024 (Jun. 14, 2024), pp. 1-2, Retrieved from the Internet: <https://web.archive.org/web/20240614003323/https://docs.snowflake.com/en/user-guide/tutorials/script-data-load-transform-parquet#unload-the-table>. [retrieved on Jun. 26, 2025].

Xinli Shang et al. Fast Copy-On-Write within Apache Parquet for Data Lakehouse ACID Upserts. Apr. 5, 2024 (Apr. 5, 2024), pp. 1-7, Retrieved from the Internet: <https://web.archive.org/web/20240405193844/https://www.uber.com/en-NL/blog/fastcopy-on-write-within-apache-parquet/>. [retrieved on Jun. 26, 2025].

\* cited by examiner

SCALABLE DATA IMPORT INTO MANAGED LAKEHOUSES

BACKGROUND

Data lakehouses refer to object stores storing managed data. Managed data refers to data objects, such as files or other tabular data with a controlled lifecycle, as opposed to unmanaged data where the data objects have an uncontrolled lifecycle. The data lakehouse can create, update, and/or delete data objects in response to modifications of content in tables of which the data objects are elements. The data lakehouse can also create and/or delete data objects to perform maintenance operations, such as merging files, splitting files, and/or rewriting files to recluster data. The maintenance operations can be indirectly triggered by modifications to the table content, such as a threshold number of row additions and/or deletions. The maintenance operations allow for improved performance over longer periods of time. By managing the data in an object store, data lakehouses allow for features not possible by data lakes due to storing unmanaged data, such as automatic storage optimization or garbage collection.

Upgrading data lake tables containing unmanaged data to data lakehouse tables containing managed data includes a data loading step. The data loading step is due to object stores of a data lake not supporting modification of files, so it is not possible to modify files of a data lake without copying the files in some form. Typically, data loading is performed using either full-copy loading or zero-copy loading. However, full-copy loading is computationally expensive as a query engine reads all input files, decodes all input files, and materializes all input files as a new set of files. Full-copy loading also increases storage costs since two copies of the same data are generated. In contrast, zero-copy loading is cheaper and more efficient than full-copy loading, as zero-copy loading conceptually registers files as-is in the data lakehouse using metadata of the files. However, zero-copy loading can cause errors in mapping files or files to be inadvertently removed as part of garbage collection operations. Further, zero-copy loading cannot fully support schema evolution or some partitioning schemes due to missing information in the files.

BRIEF SUMMARY

Aspects of the disclosure are directed to managing files in data lakehouses using rewrite-free loading. Rewrite-free loading includes keeping track of information from data files that could be missing when imported to the data lakehouses without having to perform full-copy loading. Rewrite-free loading can store this information in table metadata or augment headers and/or footers of the data files with this information when importing to a data lakehouse. Information taken from a source location is used to fill in missing information potentially lost during import, without copying the entire file. Rewrite-free loading allows for more accurate management of data lakehouses with lower computational costs.

An aspect of the disclosure provides for a method for managing files in a data lakehouse including: receiving, by one or more processors, a request from a query engine to load a data file to the data lakehouse; retrieving, by the one or more processors, the data file and information associated with the data file; generating, by the one or more processors, a header/footer file containing the information associated with the data file; generating, by the one or more processors, a new data file based on the data file and the header/footer file; and storing, by the one or more processors, the new data file in the data lakehouse. Another aspect of the disclosure provides for a system including: one or more processors; and one or more storage devices coupled to the one or more processors and storing instructions that, when executed by the one or more processors, cause the one or more processors to perform operations for the method for managing files in a data lakehouse. Yet another aspect of the disclosure provides for a non-transitory computer readable medium for storing instructions that, when executed by one or more processors, cause the one or more processors to perform operations for the method for managing files in a data lakehouse.

In an example, the information associated with the data file includes at least one of a stable column identifier, a partition key, or an integrity signature.

In another example, generating the new data file further includes concatenating the data file with the header/footer file to form a composite file; and storing the new data file further includes storing the composite file. In yet another example, at least one of a header or footer of the data file becomes available space in memory once concatenated with the header/footer file. In yet another example, the method further includes storing, by the one or more processors, an extension in the available space in memory between the data file and the header/footer file of the composite file. In yet another example, the extension includes an integrity signature. In yet another example, the extension is a non-standard extension in a data format only understandable by the data lakehouse.

In yet another example, generating the new data file further includes copying the data file; and storing the new data file further includes storing the copied data file and the header/footer file.

In yet another example, generating the new file and storing the new file is performed automatically in response to a trigger mechanism. In yet another example, the trigger mechanism includes at least one of a notification of a file addition or an instruction to list new files since a predetermined date.

DETAILED DESCRIPTION

The technology generally relates to rewrite-free loads for managing files, or more generally data objects, in data lakehouses. Rewrite-free loading allows for computationally cheaper and more efficient loading than full-copy loading without the potential errors or lack of support as seen in zero-copy loading. With rewrite-free loading, files are not decoded and re-encoded like with full-copy loading, resulting in lower computational costs, for example, due to fewer processing cycles spent decoding and recording data, as well as reduced bandwidth in reading and writing redundant data. Further, if the object store of the data lakehouse supports shallow clones and composite objects, rewrite-free loading can avoid copies entirely, resulting in a decrease in storage costs. Rewrite-free loading can include tracking information from data files that could be missing when imported to the data lakehouses without having to perform full-copy loading.

Source files from the data lake may be missing information when imported to a data lakehouse, resulting in errors or some operations to be unsupported. The missing information can be added to a destination file when performing a full-copy load, but as noted earlier, this is computationally expensive due to the decoding and re-encoding. Missing information can include stable column identifiers, partition keys, and/or integrity signatures, as examples. Rewrite-free loading stores this information, e.g., stable column identifiers, partition keys, integrity signatures, when importing to the data lakehouse. The rewrite-free loading can store this information as additional information in table metadata. Since data lakehouses include a table tracking a list of files, this list can include this information for each rewrite-free loaded file. The rewrite-free loading can further store the information in companion files and/or store the information in the data files using a private extension of a header and/or footer of respective data files.

The rewrite-free loading can augment headers and/or footers of the data files with the information. While not supporting appending operations because files cannot be modified, object stores of data lakehouse support operations to concatenate files together to create new composite files. Therefore, rewrite-free loading can involve writing a header/footer file including the information for a data file and merging the data file and the header/footer file together to generate a composite file. The composite file includes the data file plus a header and/or footer that includes the information.

The composite file can conform to any data format standard of the data lakehouse and can be read by any compatible query engine. The old header and/or footer of the data file becomes available space.

Headers and/or footers are standardized as part of the data format, which can limit types of information that can be added to them. However, rewrite-free loading allows for arbitrary information to be stored in the available space that is between the header/footer file and the old header and/or footer, which allows for non-standard extensions like storing integrity signatures that the standard extensions did not provide for. Non-standard extensions may refer to any data the data lakehouse can understand but other clients will not be able to interpret. The other clients may still be able to read the data files. Non-standard extensions can allow for more metadata in the form of headers or footers to be used in storage space that would otherwise be unutilized.

If an object store does not support composite files, rewrite-free loading can include copying the data file. This is still more efficient than a full-copy load because the data blocks being copied do not need to be decoded and re-encoded. This is because the data blocks have an internal consistency, so it is sufficient to know just the begin and end range of the data blocks when interpreting the data. Therefore, copying the data file may include copying the begin and end range while the other information to modify can be isolated to the header/footer file.

Overall, rewrite-free loading allows for storing information, such as for proper support of schema evolution and/or partitioning, in a new header/footer file. The new header/footer file is concatenated to the data file associated with the information to form a composite file that allows for avoiding copying files. The composite file can include a gap between the data file and the header/footer file, where private extensions like integrity signatures can be stored. This gap can be the available space that is between the data file and the header/footer file. Rewrite-free loading can also be combined with a trigger mechanism, such as a notification of a file addition or an ability to list new files since a given date, to enable computationally cheaper, e.g., measured in reduced processing cycles, bandwidth, and storage, and scalable autoloaders that automatically load files into a lakehouse once they are produced by an upstream system.

Figure 1:
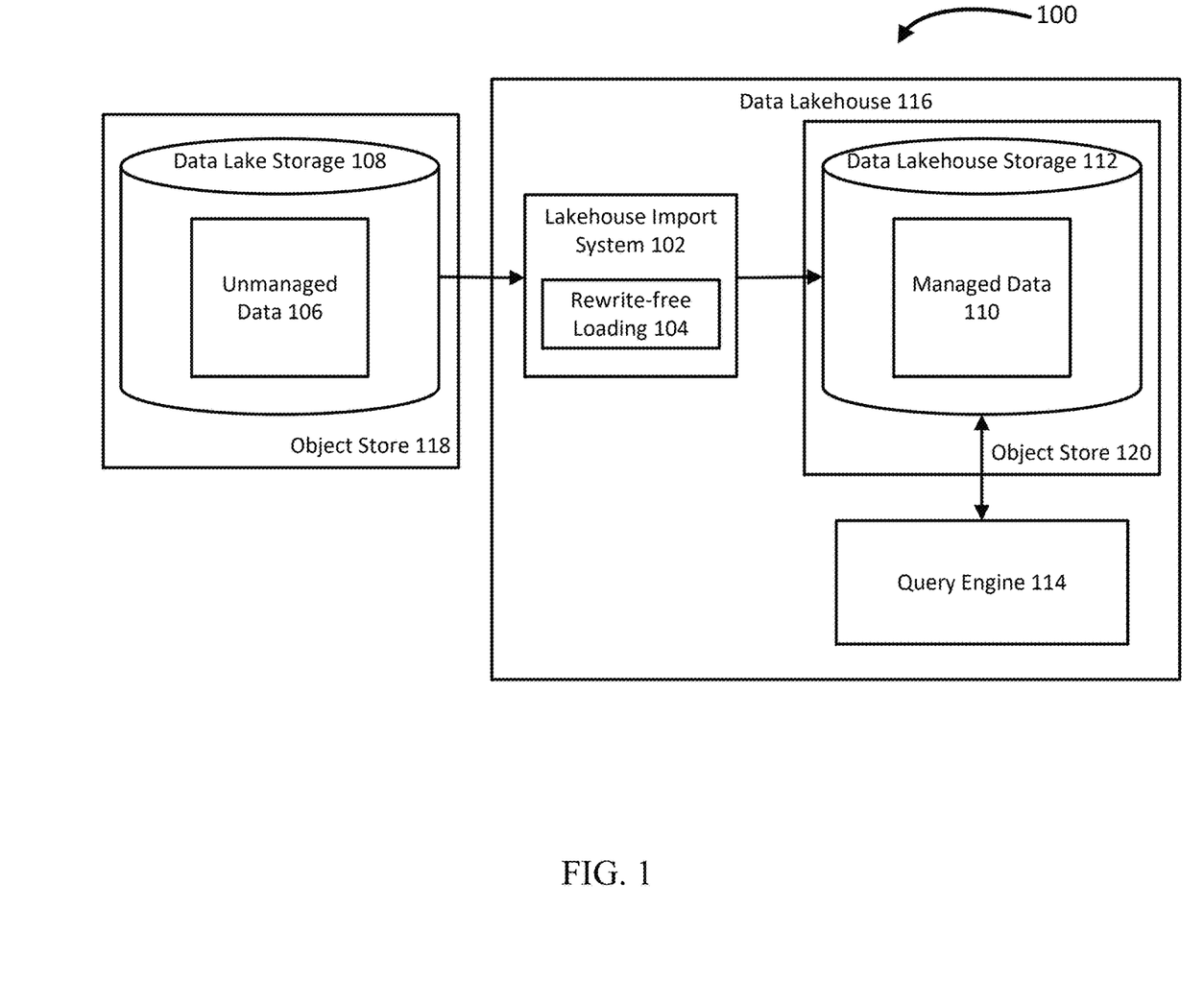
FIG. 1 depicts a block diagram of an example cloud storage system for data lakes and data lakehouses according to aspects of the disclosure.

FIG. 1 depicts a block diagram of an example cloud storage system 100 for data lakes and data lakehouses 116. The cloud storage system 100 includes a lakehouse import system 102 that implements rewrite-free loading 104 to import data from a data lake storage 108 to a data lakehouse storage 112 for processing queries via a query engine 114. The lakehouse import system 102 can be implemented on one or more computing devices in one or more locations. The data lake storage 108 and the data lakehouse storage 112 are respectively part of object store 118 and object store 120. While FIG. 1 depicts two separate object stores 118 and 120, these object stores can be the same object store. An object store refers to a storage architecture that handles data as distinct units, with each unit bundled with metadata and a unique identifier.

The data in the data lake storage 108 is unmanaged data 106 while the data in the data lakehouse storage 112 is managed data 110. Unmanaged data 106 refers to files or other tabular data with an uncontrolled lifecycle. Unmanaged data 106 is different from unstructured data, which refers to data not in tabular format, e.g., images, PDFs, etc. For example, the data lake storage 108 can correspond to an object store containing unmanaged data 106 corresponding to files that can be added and/or removed at any time without being processed. The files can be added and/or removed by a client computing device without being processed by a query engine. In contrast, managed data 110 refers to files or other tabular data with a controlled lifecycle. For example, the data lakehouse storage 112 can correspond to an object store containing managed data 110 corresponding to files that the query engine 114 can add and/or remove based on modifications to logical data pertaining to the files, e.g., row additions and/or deletions, and/or based on maintenance operations, e.g., merging files, splitting files, and/or rewriting files to recluster data. Data lakehouses 116 allow for managing data in an object store, resulting in more efficient storage with improved query processing capabilities.

Since object stores of a data lake do not support modification of files, it is not possible to modify tabular data of a data lake without copying the tabular data. Therefore, importing data from the data lake storage 108 to the data lakehouse storage 112 includes data loading via a lakehouse import system 102. The lakehouse import system 102 performs rewrite-free loading 104 that lowers computational and storage costs of data loading while maintaining or improving accuracy in importing the data to the data lakehouse storage 112.

Figure 2:
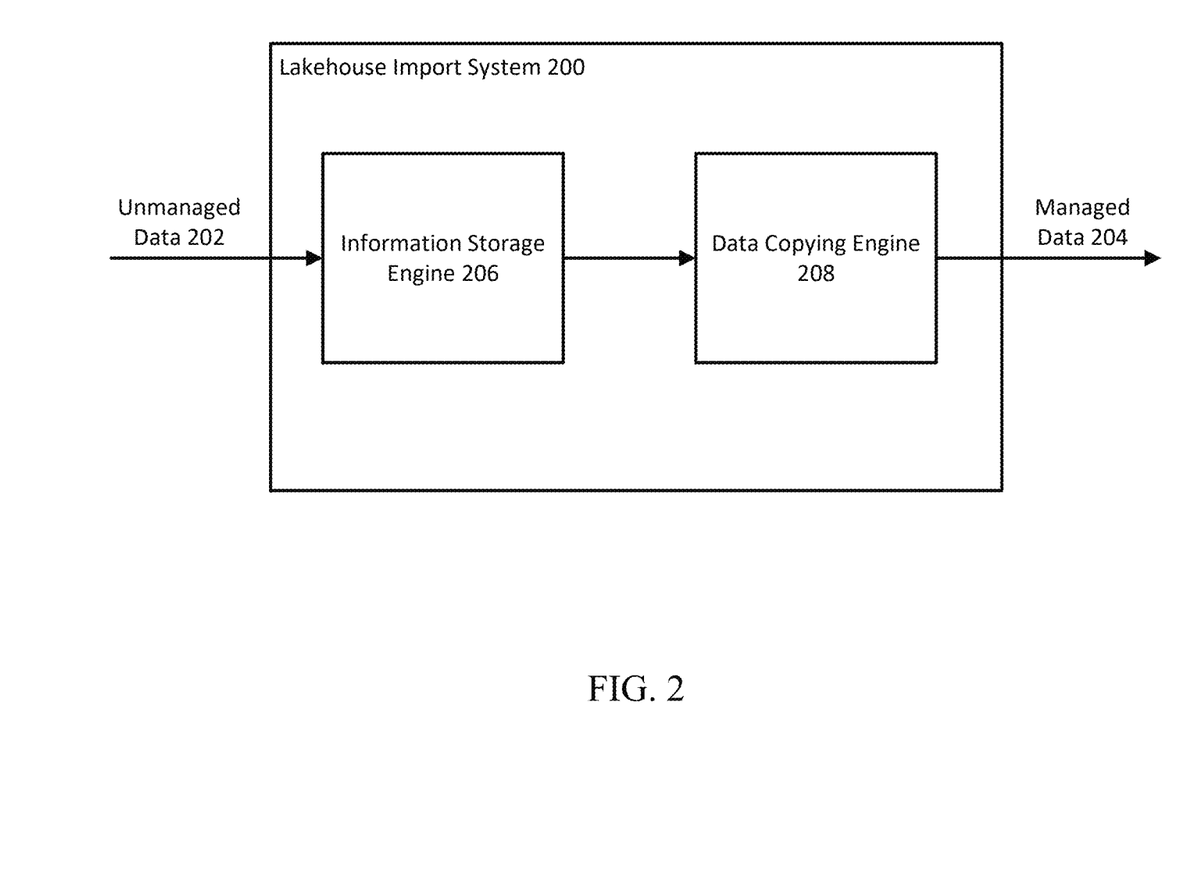
FIG. 2 depicts a block diagram of an example lakehouse import system according to aspects of the disclosure.

FIG. 2 depicts a block diagram of an example lakehouse import system 200 for performing rewrite-free loading. The lakehouse import system 200 can be implemented on one or more computing devices in one or more locations. The lakehouse import system 200 can correspond to the lakehouse import system 102 as depicted in FIG. 1.

The lakehouse import system 200 can be configured to receive unmanaged data 202. As described earlier, the unmanaged data 202 refers to data files or other tabular data with an uncontrolled lifecycle. The lakehouse import system 200 can receive the unmanaged data 202 from a data lake. For example, the lakehouse import system 200 can receive the unmanaged data 202 as part of a call to an application programming interface (API) exposing the lakehouse import system 200 to one or more computing devices. The input data 202 can also be provided to the lakehouse import system 200 through a storage medium, such as remote storage connected to one or more computing devices over a network. The input data 202 can further be provided as input through a user interface on a client computing device coupled to the lakehouse import system 200.

Based on the unmanaged data 202, the lakehouse import system 200 can be configured to output managed data 204. As described earlier, managed data 110 refers to files or other tabular data with a controlled lifecycle. The lakehouse import system 200 can send the managed data 204 to a data lakehouse. For example, the lakehouse import system 200 can be configured to send the managed data 204 to a storage device for storage and later retrieval. As another example, the lakehouse import system 200 can be configured to send the managed data 204 for display on a client or user display.

The lakehouse import system 200 can include an information storage engine 206 and a data copying engine 208. The information storage engine 206 and data copying engine 208 can be implemented as one or more computer programs, specially configured electronic circuitry, or any combination thereof.

The information storage engine 206 can be configured to store information from data files of the unmanaged data 202 that is prone to be missing when converted to the managed data 204. The data lakehouse can determine whether this information is missing by inspecting metadata about the file, such as the file path and/or existing columns in the file. The file path can encode information about a column. For example, a file path can be gs://bucket/table_name/column_a=xyz/column_b=def/file. The data lakehouse can inspect the metadata about the file, such as the file path, when receiving the file for data import. For example, the data lakehouse can determine whether column a and/or column b are present in the file based on the file path. If column a and column b are not present in the file, the data lakehouse may determine "xyz" is the value for column a and "def" is the value for column b. If this information is missing, errors in retrieving the data can occur and/or operations involving the data may become unsupported.

Examples of this information can include stable column identifiers, partition keys, and/or integrity signatures. A stable column identifier can uniquely identify a column across all versions of the same table, even if the name of the column changes across versions. Stable column identifiers allow for schema evolution, such as adding, removing, and/or renaming columns. A partition key, or more generally partition information, refers to a value of a column for physically grouping data. The partition information can be encoded into a file path of data files. For example, given a two-column table of three rows: (1,a), (1,b), (2,c), partitioning on the first column will group the first two rows in the same partition because they have the same value "1". The value "1" can be encoded in the file path leading to the storage location for these two rows and thus can be omitted from the data files in this partition. Integrity signatures refer to cryptographic signatures in data files that allow the lakehouse to verify their integrity to avoid files being modified through direct operations on object stores by users.

The information storage engine 206 can store this information as additional information in a metadata table. The metadata table can include a list of files to be imported to the data lakehouse along with this information for each file to be loaded to the data lakehouse. Alternatively, or additionally, the information storage engine 206 can store this information in a companion file to the file being loaded to the data lakehouse. Alternatively, or additionally, the information storage engine 206 can store this information in the data files themselves, using a private extension of a header and/or footer of each file to be loaded to the data lakehouse.

The data copying engine 208 can be configured to augment headers and/or footers of the data files to be imported to the data lakehouse with the information prone to being missing, e.g., stable column identifiers, partition keys, and/or integrity signatures. The data copying engine 208 can concatenate files together to create composite files that include the data files and the information. The data copying engine 208 can write a header/footer file that includes the information for the data file and combine the data file with the header/footer file to generate the composite file, which includes the data file plus a header and/or footer for the information. The composite file can be in any data format standard, e.g., column-oriented formats, row-oriented formats, and/or open-source formats, for the data lakehouse and can be read by any query engine.

Figure 3:
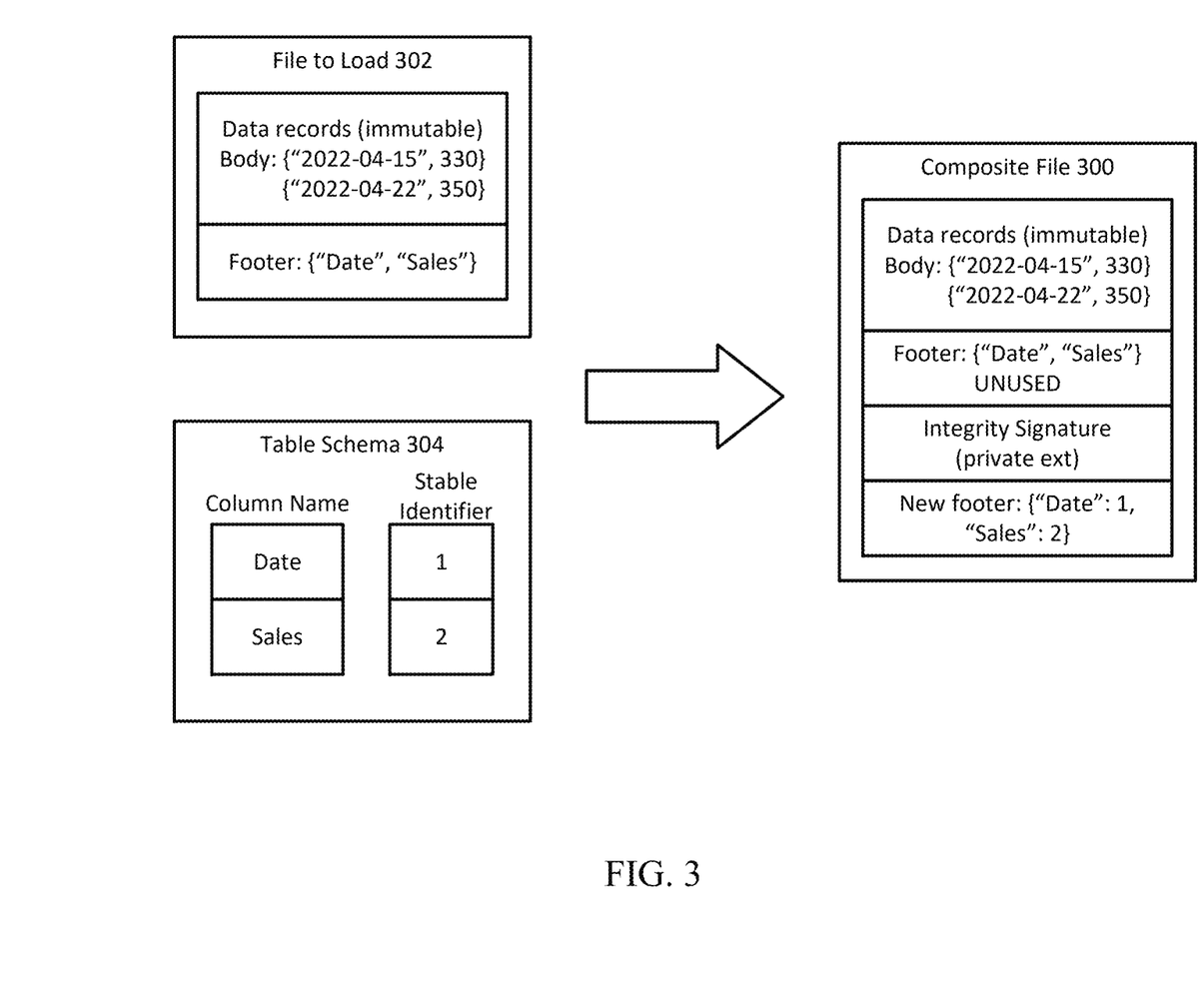
FIG. 3 depicts a block diagram of an example composite file according to aspects of the disclosure.

FIG. 3 depicts a block diagram of an example composite file 300. A data file to load 302 and corresponding table schema 304 are combined to create the composite file 300. The composite file 300 includes the substance of the data file, an unused section that was previously the footer of the data file, and the information from the table schema as the new footer of the composite file 300. Alternatively, the unused section can also be removed if the data lakehouse supports such removal. The composite file 300 also includes an integrity signature as a private extension. The composite file 300 can store the integrity signature as a non-standard extension because any information can be stored in the dead space between the header/footer file and the header and/or footer of the data file.

Referring back to FIG. 2, if composite files are not supported, the data copying engine 208 can be configured to copy the data file without performing a full-copy load. The data copying engine 208 can copy the data files without decoding and re-encoding the data files due to the internal consistency of the data files. Based on the internal consistency, the data copying engine 208 can be configured to copy the beginning and end ranges of the data files to be imported to the data lakehouse while having the information for the data files as a separate header/footer file.

Figure 4:
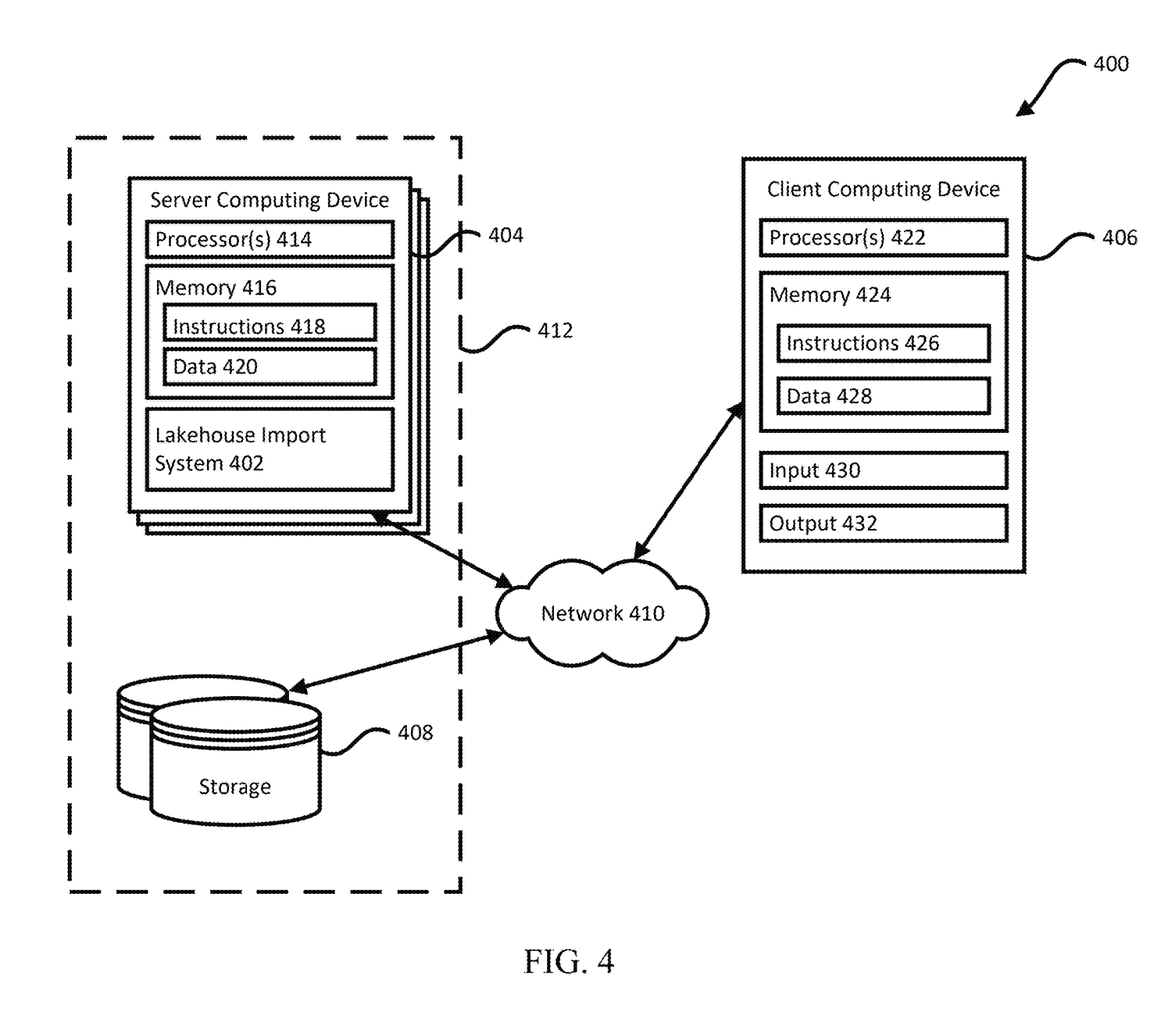
FIG. 4 depicts a block diagram of an example computing environment implementing a lakehouse import system for a cloud storage system according to aspects of the disclosure.

FIG. 4 depicts a block diagram of an example computing environment 400 implementing a lakehouse import system 402 for a cloud storage system. The lakehouse import system 402 can correspond to the lakehouse import system 102 as depicted in FIG. 1. The lakehouse import system 402 can be implemented on one or more devices having one or more processors in one or more locations, such as in a server computing device 404. A client computing device 406 and the server computing device 404 can be communicatively coupled to one or more storage devices 408 over a network 410. The server computing device 404 and the storage devices 408 can form part of a cloud computing system 412 for cloud computing services such as Infrastructure as a Service (IaaS), Platform as a Service (PaaS), and/or Software as a Service (SaaS).

For example, the client computing device 406 may use the cloud computing system 412 as a service that provides software applications, such as accounting, word processing, inventory tracking, fraud detection, file sharing, video sharing, audio sharing, communication, or gaming. As another example, the client computing device 406 can access the cloud computing system 412 as part of one or more operations that employ machine learning, deep learning, and/or artificial intelligence technology to train the software applications. The cloud computing system 412 can provide model parameters that can be used to update machine learning models for the software applications.

The storage devices 408 can be a combination of volatile and non-volatile memory and can be at the same or different physical locations than the computing devices 404, 406. For example, the storage devices 408 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 404 can include one or more processors 414 and memory 416. The memory 416 can store information accessible by the processors 414, including instructions 418 that can be executed by the processors 414. The memory 416 can also include data 420 that can be retrieved, manipulated, or stored by the processors 414. The memory 416 can be a type of non-transitory computer readable medium capable of storing information accessible by the processors 414, such as volatile and non-volatile memory. The processors 414 can include one or more central processing units (CPUs), graphic processing units (GPUs), field-programmable gate arrays (FPGAs), and/or application-specific integrated circuits (ASICs), such as tensor processing units (TPUs).

The instructions 418 can include one or more instructions that when executed by the processors 414, cause the one or more processors to perform actions defined by the instructions 418. The instructions 418 can be stored in object code format for direct processing by the processors 414, or in other formats including interpretable scripts or collections of independent source code modules that are interpreted on demand or compiled in advance. The instructions 418 can include instructions for implementing the lakehouse import system 402. The lakehouse import system 402 can be executed using the processors 414, and/or using other processors remotely located from the server computing device 404.

The data 420 can be retrieved, stored, or modified by the processors 414 in accordance with the instructions 418. The data 420 can be stored in computer registers, in a relational or non-relational database as a table having a plurality of different fields and records, or as JSON, YAML, proto, or XML documents. The data 420 can also be formatted in a computer-readable format such as, but not limited to, binary values, ASCII, or Unicode. Moreover, the data 420 can include information sufficient to identify relevant information, such as numbers, descriptive text, proprietary codes, pointers, references to data stored in other memories, including other network locations, or information that is used by a function to calculate relevant data.

The client computing device 406 can also be configured similarly to the server computing device 404, with one or more processors 422, memory 424, instructions 426, and data 428. The client computing device 406 can also include a client input 430 and a client output 432. The client input 430 can include any appropriate mechanism or technique for receiving input from a client, such as keyboard, mouse, mechanical actuators, soft actuators, touchscreens, microphones, and sensors.

The server computing device 404 can be configured to transmit data to the client computing device 406, and the client computing device 406 can be configured to display at least a portion of the received data on a display implemented as part of the client output 432. The client output 432 can also be used for displaying an interface between the client computing device 406 and the server computing device 404. The client output 432 can alternatively or additionally include one or more speakers, transducers or other audio outputs, a haptic interface or other tactile feedback that provides non-visual and non-audible information to a client of the client computing device 406.

Although FIG. 4 illustrates the processors 414, 422 and the memories 416, 424 as being within the computing devices 404, 406, components described herein, including the processors 414, 422 and the memories 416, 424 can include multiple processors and memories that can operate in different physical locations and not within the same computing device. For example, some of the instructions 418, 426 and the data 420, 428 can be stored on a removable SD card and other instructions within a read-only computer chip. Some or all of the instructions 418, 426 and data 420, 428 can be stored in a location physically remote from, yet still accessible by, the processors 414, 422. Similarly, the processors 414, 422 can include a collection of processors that can perform concurrent and/or sequential operations. The computing devices 404, 406 can each include one or more internal clocks providing timing information, which can be used for time measurement for operations and programs run by the computing devices 404, 406.

The computing devices 404, 406 can be capable of direct and indirect communication over the network 410. The devices 404, 406 can set up listening sockets that may accept an initiating connection for sending and receiving information. The network 410 itself can include various configurations and protocols including the Internet, World Wide Web, intranets, virtual private networks, wide area networks, local networks, and private networks using communication protocols proprietary to one or more companies. The network 410 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network 410, in addition or alternatively, can also support wired connections between the computing devices 404, 406, including over various types of Ethernet connection.

Although a single server computing device 404 and user computing device 406 are shown in FIG. 4, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Figure 5:
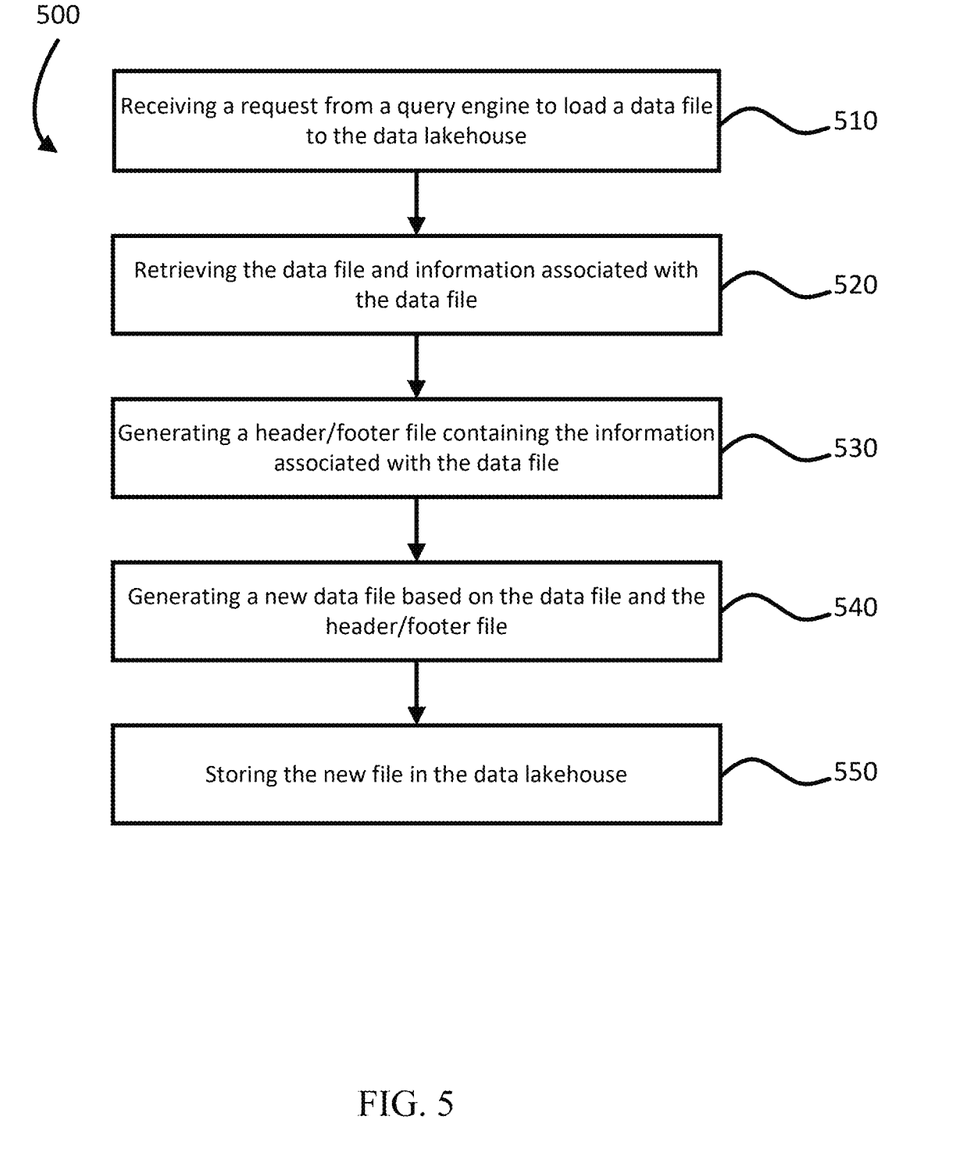
FIG. 5 depicts an example process for managing files in a data lakehouse according to aspects of the disclosure.

FIG. 5 depicts an example process 500 for managing files in a data lakehouse of a cloud storage system. The example process 500 can be performed on a system of one or more processors in one or more locations, such as the lakehouse import system 102 as depicted in FIG. 1.

As shown in block 510, the lakehouse import system 102 receives a request to load a data file to the data lakehouse. The request can be received from the query engine.

As shown in block 520, the lakehouse import system 102 retrieves the data file and information associated with the data file. The lakehouse import system 102 can retrieve the data file and the information from a data lake. The information associated with the data file can include stable column identifiers, partition keys, and/or integrity signatures, as examples.

As shown in block 530, the lakehouse import system 102 generates a header/footer file containing the information associated with the data file.

As shown in block 540, the lakehouse import system 102 generates a new data file based on the data file and the header/footer file. If the data lakehouse supports composite files, the lakehouse import system 102 can concatenate the data file with the header/footer file to form a composite file. A header and/or footer of the data file can become dead space in the composite file once the data file is concatenated with the header/footer file. The lakehouse import system 102 can further store an extension in a gap between the data file and the header/footer file of the composite file. The extension can include an integrity signature, as an example. The extension can be a non-standard extension in a data format that can only be understandable, e.g., processed, by the data lakehouse.

If the data lakehouse does not support composite files, the lakehouse import system 102 can copy the data file without performing a full-copy load. The lakehouse import system 102 can copy the data file without decoding and re-encoding the data file.

As shown in block 550, the lakehouse import system 102 stores the new data file in the data lakehouse. If the data lakehouse supports composite files, the lakehouse import system 102 can store a composite file in the data lakehouse, the composite file being the data file concatenated with the header/footer file. If the data lakehouse does not support composite files, the lakehouse import system 102 can store a copy of the data file and the header/footer file.

The lakehouse import system can generate the new data file and store the new data file automatically in response to a trigger mechanism. The trigger mechanism can be a notification of a file addition in the data lakehouse and/or a notification to list new files in the data lakehouse from a predetermined data. The notifications can be received from a query engine.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, which is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" or "data processing system" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for managing files in a data lakehouse comprising:
   receiving, by one or more processors, a request from a query engine to load a data file to the data lakehouse;
   retrieving, by the one or more processors, the data file and information associated with the data file;
   generating, by the one or more processors, a header/footer file containing the information associated with the data file;
   generating, by the one or more processors, a composite file based on the data file and the header/footer file by concatenating the data file with the header/footer file, wherein at least one of a header or footer of the data file becomes available space in memory; and
   storing, by the one or more processors, the composite file in the data lakehouse.

2. The method of claim 1, wherein the information associated with the data file comprises at least one of a stable column identifier, a partition key, or an integrity signature.

3. The method of claim 1, wherein the header or footer of the data file becomes available space in memory in response to being concatenated with the header/footer file.

4. The method of claim 1, further comprising storing, by the one or more processors, an extension in the available space in memory between the data file and the header/footer file of the composite file.

5. The method of claim 4, wherein the extension comprises an integrity signature.

6. The method of claim 4, wherein the extension is a non-standard extension in a data format only understandable by the data lakehouse.

7. The method of claim 1, further comprising:
   receiving, by the one or more processors, a second request from the query engine or a second query engine to load a second data file to the data lakehouse;
   retrieving, by the one or more processors, the second data file and information associated with the second data file;
   generating, by the one or more processors, a second header/footer file containing the information associated with the second data file;
   copying, by the one or more processors, the second data file to generate a copied data file; and
   storing, by the one or more processors, the copied data file and the second header/footer file in the data lakehouse.

8. The method of claim 1, wherein generating the composite file and storing the composite file is performed automatically in response to a trigger mechanism.

9. The method of claim 8, wherein the trigger mechanism comprises at least one of a notification of a file addition or an instruction to list new files since a predetermined date.

10. A system comprising:
    one or more processors; and
    one or more storage devices coupled to the one or more processors and storing instructions that, when executed by the one or more processors, cause the one or more processors to perform operations for managing files in a data lakehouse, the operations comprising:
      receiving a request from a query engine to load a data file to the data lakehouse;
      retrieving the data file and information associated with the data file;
      generating a header/footer file containing the information associated with the data file;
      generating a composite file based on the data file and the header/footer file by concatenating the data file with the header/footer file, wherein at least one of a header or footer of the data file becomes available space in memory; and
      storing the composite file in the data lakehouse.

11. The system of claim 10, wherein the information associated with the data file comprises at least one of a stable column identifier, a partition key, or an integrity signature.

12. The system of claim 10, wherein the header or footer of the data file becomes available space in memory in response to being concatenated with the header/footer file.

13. The system of claim 10, wherein the operations further comprise storing an extension in the available space in memory between the data file and the header/footer file of the composite file.

14. The system of claim 13, wherein the extension comprises an integrity signature.

15. The system of claim 13, wherein the extension is a non-standard extension in a data format only understandable by the data lakehouse.

16. The system of claim 10, wherein the operations further comprise:
   receiving a second request from the query engine or a second query engine to load a second data file to the data lakehouse;
   retrieving the second data file and information associated with the second data file;
   generating a second header/footer file containing the information associated with the second data file;
   copying the second data file to generate a copied data file; and
   storing the copied data file and the second header/footer file in the data lakehouse.

17. The system of claim 10, wherein generating the composite file and storing the composite file is performed automatically in response to a trigger mechanism.

18. A non-transitory computer readable medium for storing instructions that, when executed by one or more processors, cause the one or more processors to perform operations for managing files in a data lakehouse, the operations comprising:
   receiving a request from a query engine to load a data file to the data lakehouse;
   retrieving the data file and information associated with the data file;
   generating a header/footer file containing the information associated with the data file;
   generating a composite file based on the data file and the header/footer file by concatenating the data file with the header/footer file, wherein at least one of a header or footer of the data file becomes available space in memory; and
   storing the composite file in the data lakehouse.

* * * * *